United States Patent [19]

Kozlowski, Jr. et al.

[11] Patent Number: 5,758,523

[45] Date of Patent: Jun. 2, 1998

[54] LOCK CONSTRUCTION FOR AUTOMOTIVE SPARE WHEEL WINCH

[75] Inventors: William J. Kozlowski, Jr., Tonawanda; James P. Markey, Colden; Lawrence G. Strasser, Jr., Cheektowaga, all of N.Y.

[73] Assignee: McGard, Inc., Orchard Park, N.Y.

[21] Appl. No.: 587,925

[22] Filed: Jan. 17, 1996

[51] Int. Cl.⁶ .................................................. E05B 65/12
[52] U.S. Cl. .......................... 70/259; 70/14; 224/42.23
[58] Field of Search .......................... 70/14, 259, 260; 224/42.06, 42.23

[56] References Cited

U.S. PATENT DOCUMENTS

| | | | |
|---|---|---|---|
| 1,741,314 | 12/1929 | Johnson | 70/259 |
| 1,942,176 | 1/1934 | Lowe . | |
| 2,659,229 | 11/1953 | Skillman et al. | 70/259 |
| 3,372,821 | 3/1968 | Podhajsky | 214/451 |
| 3,431,756 | 3/1969 | Fennell | 70/259 |
| 3,513,673 | 5/1970 | Trainor | 70/259 |
| 3,865,264 | 2/1975 | Kuhns | 214/451 |
| 3,952,894 | 4/1976 | Mendez | 214/451 |
| 4,249,682 | 2/1981 | Yasue et al. | 224/42.23 |
| 4,526,021 | 7/1985 | Princell | 70/183 |
| 4,818,032 | 4/1989 | Thomas | 70/259 X |
| 4,848,113 | 7/1989 | Parks | 70/259 |
| 4,988,023 | 1/1991 | Heathcoat | 70/259 X |
| 5,077,995 | 1/1992 | Appelbaum | 70/259 |
| 5,102,022 | 4/1992 | Knezovich | 70/259 X |
| 5,199,287 | 4/1993 | McClary | 70/259 |
| 5,330,313 | 7/1994 | Easterwood | 70/259 X |
| 5,343,722 | 9/1994 | Richardson | 70/259 |
| 5,477,711 | 12/1995 | Oliveri | 70/259 X |
| 5,582,048 | 12/1996 | Schotthoefer | 70/259 |

FOREIGN PATENT DOCUMENTS

| | | |
|---|---|---|
| 902011 | 6/1972 | Canada . |
| 1014447 | 12/1955 | Germany . |

*Primary Examiner*—Suzanne Dino
*Attorney, Agent, or Firm*—Joseph P. Gastel

[57] ABSTRACT

A lock arrangement for blocking the open end of a winch inlet tube of a spare wheel hoist and storage winch mounted on a vehicle frame having a bumper mounted thereon with a hole in the bumper for permitting access to the winch inlet tube, the lock arrangement including an extension tube for mounting between the hole in the bumper and the opening in the winch inlet tube and a closure for selectively blocking the open end of the extension tube including a key-actuated lock on the closure for selectively permitting removal of the closure from the second end of the extension tube to thereby permit an elongated crank member to pass through the extension tube and the winch inlet tube for actuating the winch.

33 Claims, 6 Drawing Sheets

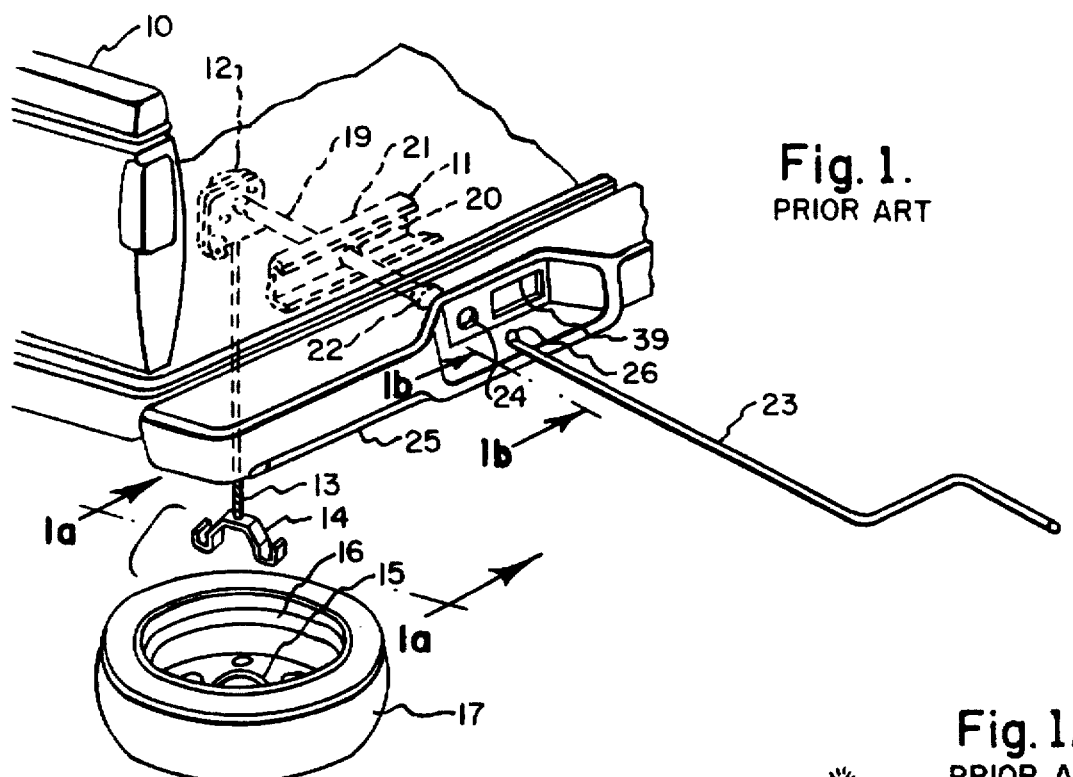
Fig. 1. PRIOR ART
Fig. 1A. PRIOR ART
Fig. 1B. PRIOR ART
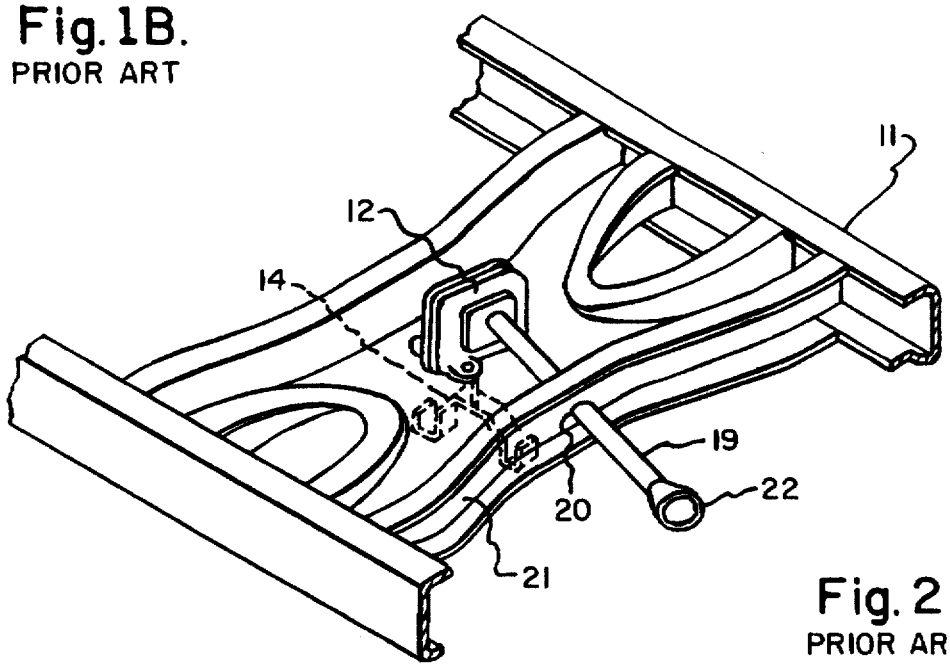
Fig. 2. PRIOR ART

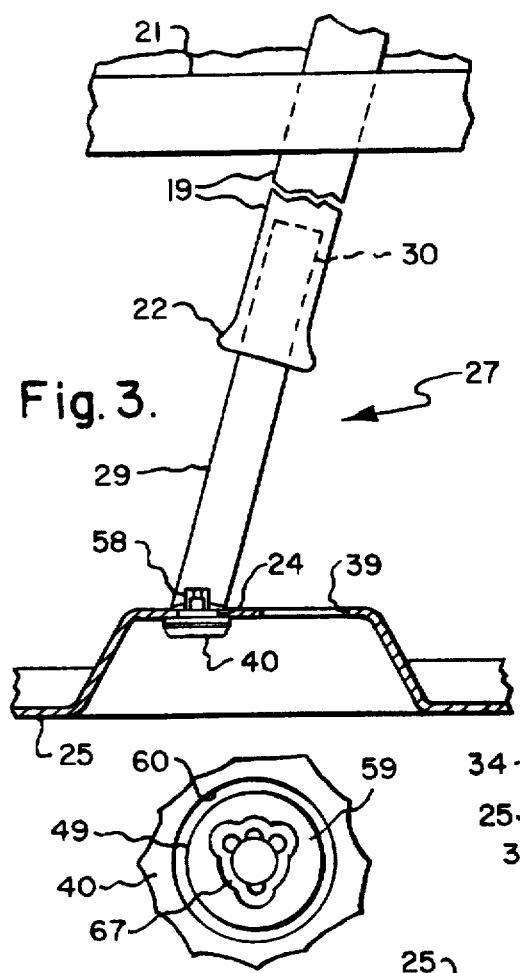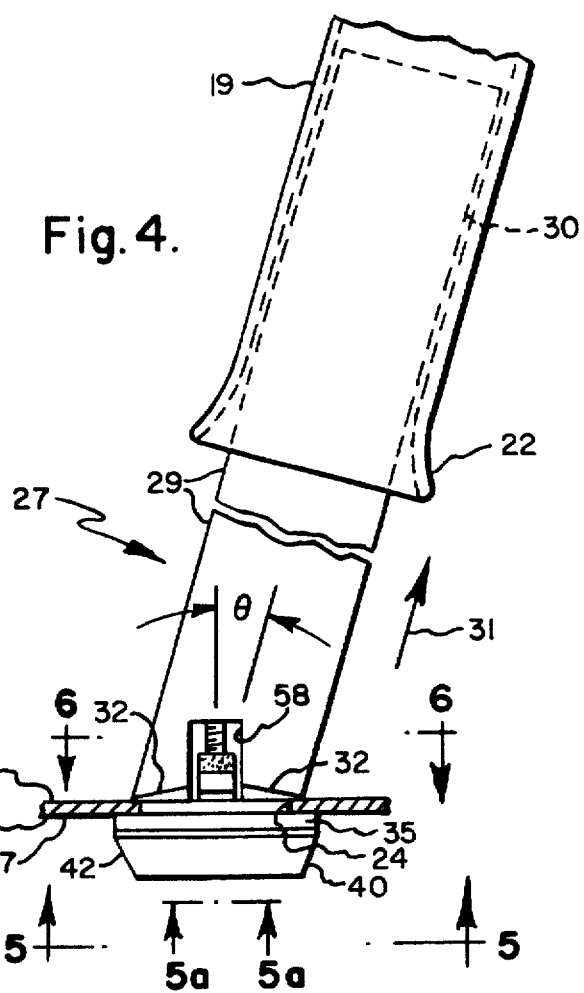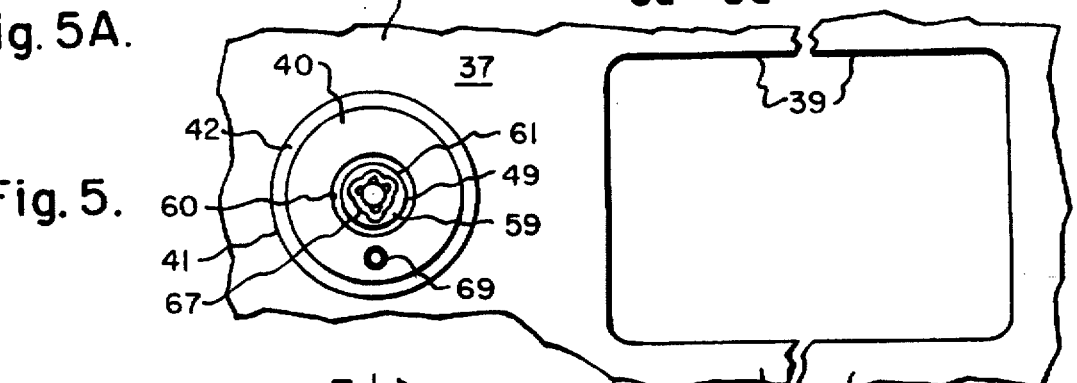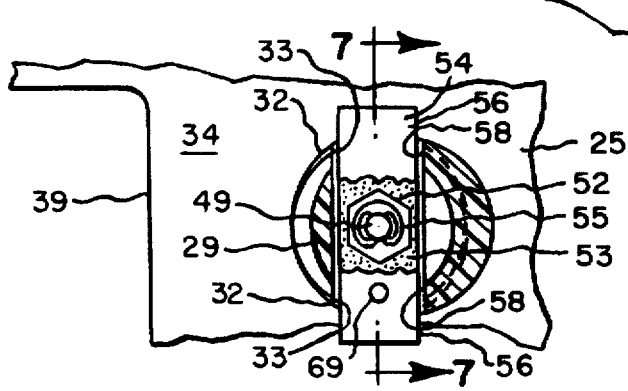

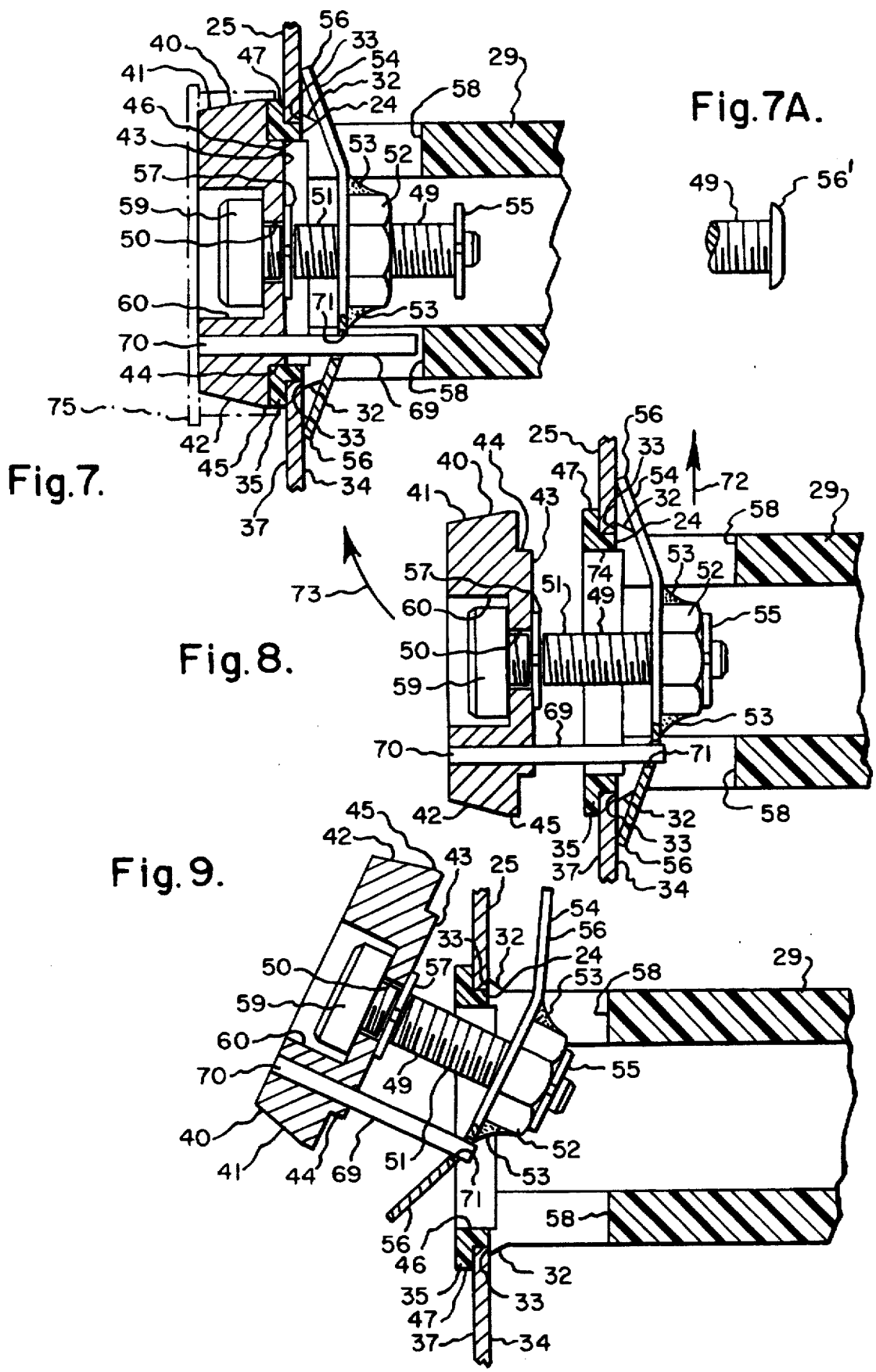

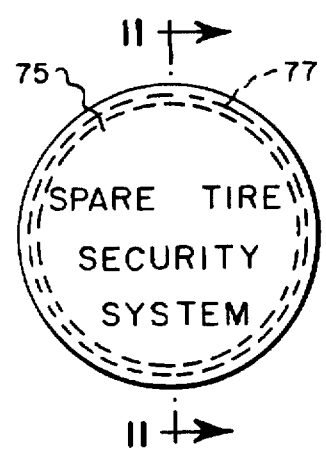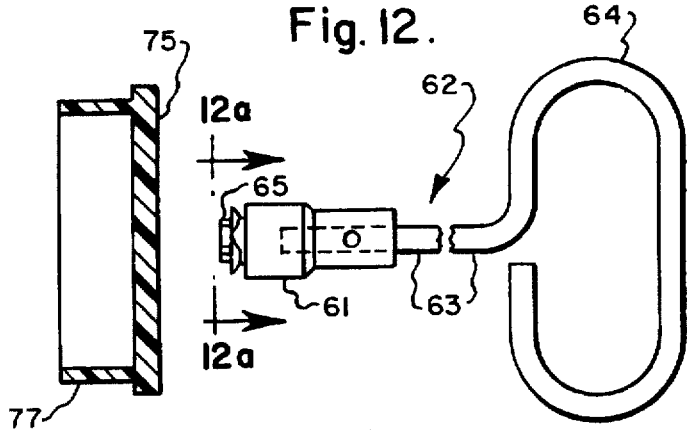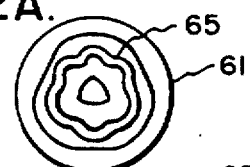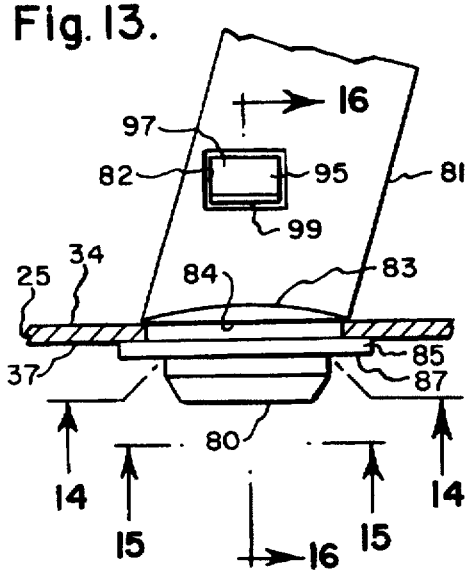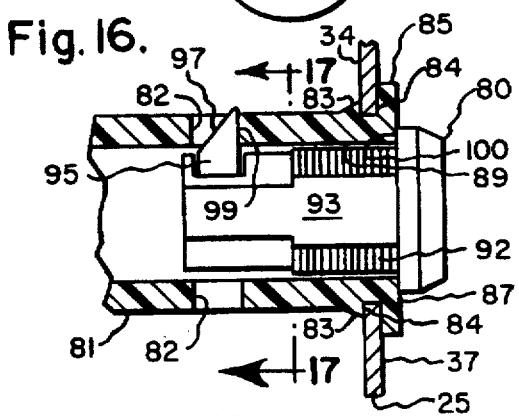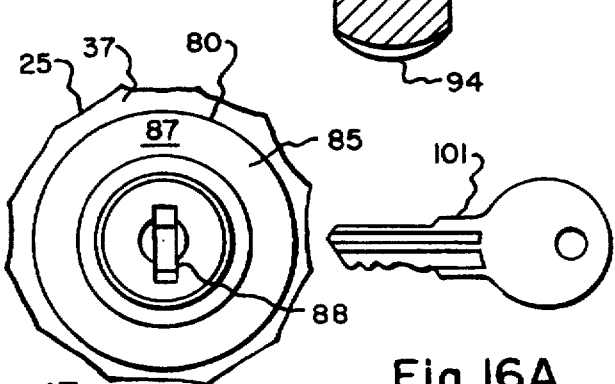

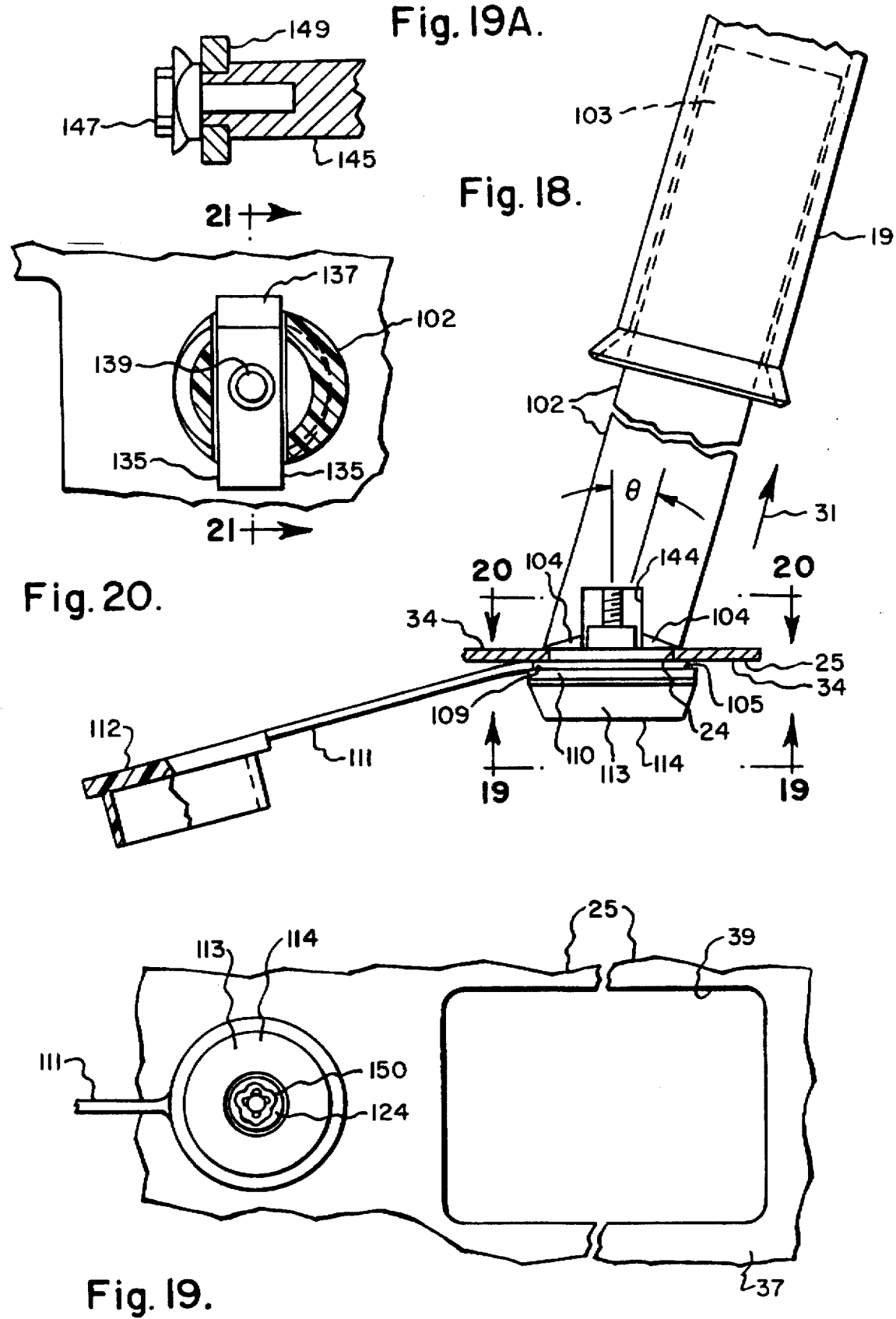

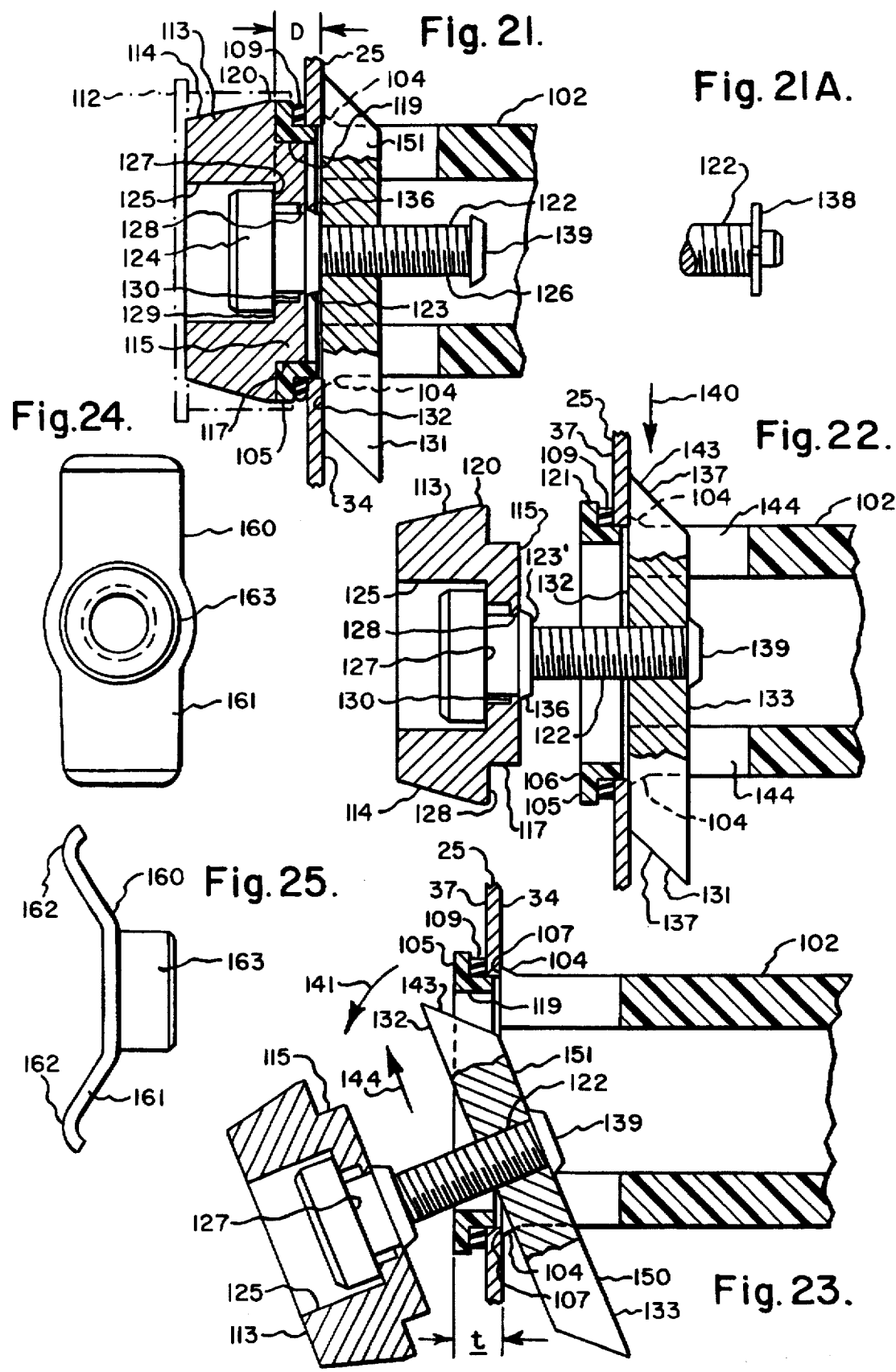

5,758,523

1

LOCK CONSTRUCTION FOR AUTOMOTIVE SPARE WHEEL WINCH

BACKGROUND OF THE INVENTION

The present invention relates to a lock construction for the spare wheel winch of an automotive vehicle.

By way of background, certain automotive vehicles include a spare wheel hoist and storage construction including a winch which is utilized to raise a spare wheel into a storage position and lower it therefrom for use. However, the winch is actuatable by means of a crank, and thus the spare wheel is susceptible of theft by anyone having a suitable crank. It is with overcoming the foregoing deficiency that the present invention is concerned.

SUMMARY OF THE INVENTION

It is accordingly the object of the present invention to provide a lock arrangement which can be incorporated into an existing winch structure on an automotive vehicle for preventing unauthorized operation of the winch, and thus preventing unauthorized removal of the spare wheel. Other objects and attendant advantages of the present invention will readily be perceived hereafter.

The present invention relates to a lock arrangement for blocking an open end of a winch inlet tube of a spare wheel hoist and storage winch comprising an extension tube, a first end on said extension tube for insertion into an open end of said winch inlet tube, a second end on said extension tube for mounting in a hole of a bumper, a closure on said second end of said extension tube, and a key-actuated lock on said closure for selectively permitting removal of said closure from said second end of said extension tube to thereby permit passage of a winch actuation member through said extension tube and through said winch inlet tube for actuating said winch.

The various aspects of the present invention will be more fully understood when the following portions of the specification are read in conjunction with the accompanying drawings wherein:

BRIEF DESCRIPTION OF THE DRAWINGS

FIG. 1 is a fragmentary perspective view of the rear end of an automotive vehicle having a prior art spare wheel hoist and storage winch construction and an actuating crank therefor for raising and lowering a vehicle wheel;

FIG. 1A is a fragmentary cross sectional view taken substantially along line 1A—1A of FIG. 1 and showing the vehicle wheel engaged by the bracket at the end of the winch cable;

FIG. 1B is a fragmentary side elevational view of the end of the crank which is inserted into the winch tube for actuating the winch;

FIG. 2 is a fragmentary perspective view showing further details of the prior art winch structure mounted on the frame of the vehicle;

FIG. 3 is a fragmentary plan view, partially in cross section, showing the lock arrangement of the present invention mounted between the vehicle bumper and the winch tube;

FIG. 4 is an enlarged fragmentary plan view, partially in cross section, of one embodiment of the lock arrangement of the present invention mounted between the bumper and the winch tube;

FIG. 5 is a fragmentary view taken substantially in the direction of arrows 5—5 of FIG. 4 and showing the surface of the bumper with the lock arrangement mounted therein;

2

FIG. 5A is an enlarged fragmentary view taken substantially in the direction of arrows 5A—5A of FIG. 4 and showing the face of the lock;

FIG. 6 is a fragmentary cross sectional view taken substantially along line 6—6 of FIG. 4 and showing the wing of the lock arrangement in position engaging the inner surface of the bumper;

FIG. 7 is an enlarged fragmentary cross sectional view taken substantially along line 7—7 of FIG. 6 and showing the lock in a locked position;

FIG. 7A is a fragmentary view showing a modified bolt end which is peened;

FIG. 8 is a fragmentary cross sectional view similar to FIG. 7 but showing the lock in a loosened condition for removal from the end of the extension tube;

FIG. 9 is a fragmentary cross sectional view similar to FIG. 8 but showing the lock moved to a position for removal from the opening in the end of the extension tube;

FIG. 10 is a front elevational view of a cap which can be mounted on the outside of the lock to protect the entry of debris;

FIG. 11 is a cross sectional view taken substantially along line 11—11 of FIG. 10;

FIG. 12 is a fragmentary side elevational view of an elongated key which is utilized to loosen and tighten the lock of FIGS. 3–9;

FIG. 12A is an enlarged view taken substantially in the direction of arrows 12A—12A of FIG. 12 and showing the face of the key;

FIG. 13 is a fragmentary view similar to a portion of FIG. 4 and showing another embodiment of the present invention which utilizes a tumbler type lock;

FIG. 14 is a fragmentary cross sectional view taken substantially along line 14—14 of FIG. 13 and showing the configuration of the face of the extension tube and the configuration of the lock body;

FIG. 15 is a fragmentary view taken substantially in the direction of arrows 15—15 of FIG. 13 and showing the lock arrangement in position in the end of the extension tube;

FIG. 16 is a fragmentary cross sectional view taken substantially along line 16—16 of FIG. 13 and showing the lock arrangement in locking position;

FIG. 16A is a side elevational view of the key for actuating the lock of FIG. 16;

FIG. 17 is a cross sectional view of the lock body taken substantially along line 17—17 of FIG. 16;

FIG. 18 is a fragmentary plan view similar to FIG. 4 and showing a preferred embodiment of the present invention;

FIG. 19 is a fragmentary view taken substantially in the direction of arrows 19—19 of FIG. 18;

FIG. 19A is a fragmentary view, partially in cross section, showing the head of the key for unlocking the lock;

FIG. 20 is a fragmentary cross sectional view taken substantially along line 20—20 of FIG. 18;

FIG. 21 is an enlarged fragmentary cross sectional view taken substantially along line 21—21 of FIG. 20 and showing the lock in a locked position;

FIG. 21A is a fragmentary side elevational view of an alternate end construction for the bolt;

FIG. 22 is a fragmentary cross sectional view similar to FIG. 21 but showing the lock in a loosened condition for removal from the end of the extension tube;

FIG. 23 is a fragmentary cross sectional view similar to FIG. 22 but showing the lock moved to a position for removal from the opening in the end of the extension tube;

FIG. 24 is a plan view of an alternate type of wing which can be used in the embodiment of FIGS. 18–23; and FIG. 25 is a side elevational view of the wing of FIG. 24.

DESCRIPTION OF THE PREFERRED EMBODIMENTS

The vehicle 10 of FIG. 1 has a frame 11 (FIG. 2) with a spare wheel hoist and storage winch 12 mounted thereon. A cable 13 is associated with the winch, and it mounts a bracket 14 at its outer end which is adapted to be attached to the inner annular peripheral portion 15 of the wheel rim 16 which mounts tire 17. An elongated winch inlet tube 19 extends outwardly from winch 12, and its central portion is supported in a hole 20 in vehicle frame member 21. The end of tube 19 has a bell mouth 22 which is spaced from bumper 25. An elongated crank 23 is inserted through existing hole 24 in bumper 25 and then into bell mouth 22 of tube 19 for actuating the winch. Crank 23 has a configured end 26 which keys with a mating part of winch 12 to actuate it. A wheel rim, such as 16, with a tire 17 mounted thereon, could be unauthorizedly removed from a stored position by anyone having a crank, such as 23, or a similar device which could be inserted through bumper aperture 24 and into tube 19.

In accordance with the present invention, the lock arrangement 27 of the present invention is incorporated into the existing prior art construction described above relative to FIGS. 1, 1A, 1B and 2 for preventing unauthorized removal of wheel rim 16 and tire 17. More specifically, the lock arrangement 27 of the present invention basically includes an extension tube 29 (FIG. 3) having a length such that its inner end 30 fits into the bell mouth 22 of winch tube 19. The opposite end of extension tube 29 is firmly secured in bumper hole 24 which is spaced from bell mouth 22. During installation, extension tube 29 is inserted into tube 19 by initially passing its end 30 through hole 24 in bumper 25, and thereafter the extension tube 29 is moved in the direction of arrow 31 (FIG. 4) until its end 30 enters bell mouth 22 and until lips in the form of ramps 32 (FIG. 7) on resilient plastic tube 29 pass through bumper hole 24 and snap back to the position shown in FIG. 7 wherein ends 33 of ramps 32 engage the rear surface 34 of bumper 25. At this time the annular lip 35 at the outer end of tube 29 will engage the outer surface 37 of bumper 25 to thereby securely lock tube 29 in position. Lip 35 extends at an angle to the axis of tube 29. This angle thus permits lip 35 and ramps 32 to lie flush with the face 37 and rear surface 34, respectively, of the bumper while the longitudinal axis of extension tube 29 is aligned with the longitudinal axis of winch tube 19.

The extension tube 29 performs a plurality of functions. It blocks access to the bell mouth 22 of winch tube 19 in the sense that an elongated winch actuating member 23 cannot be inserted into winch tube 19 through the preexisting rectangular opening 39 in bumper 25 even if bumper hole 24 is blocked. Secondly, it functions as a guide for elongated crank 23 so that once the latter is inserted into extension tube 29, it will pass into tube 19 whereas previously crank 23 had to be visually aligned with the tube opening 22 which was spaced from bumper hole 24. Thirdly, the lip 35 functions as a surface against which a closure disc 41 of lock 40 bears.

In the embodiment of FIGS. 3–12, the lock 40 includes a closure disc 41 having an outer diameter which is equal to the outer diameter of tube lip 35. The outer edge 42 of disc 41 is beveled so that it cannot be gripped by a wrench. The rear surface 43 of disc 41 is formed with an annular shoulder 44 (FIG. 8) which is of an outer diameter which is substantially equal to the inner diameter of the opening 46 of extension tube 29 so that it will center disc 41 coaxially with tube 29, and thus the outermost edge 45 of bevel 42 will be aligned with the outer edge 47 of lip 35.

A threaded bolt 49 is rotatably mounted in bore 50 of disc 40. Bolt 49 includes a central threaded portion 51, and this threaded portion is received in nut 52 which is welded at 53 to bar or wing 54. A C-clip 55 is mounted at the end of bolt 49 to limit motion of nut 52 to the right from its position in FIG. 7. Alternatively, the end of bolt 49 may be peened at 56' for this purpose. A second C-clip 57 is mounted at the left end of threads 51 to maintain the head 59 of bolt 49 within the counterbore 60 of disc 41.

When bolt 49 is in a tightened condition, as shown in FIG. 7, the outer ends 56 of wing 54 will bear against the inner surface 34 of bumper 25. The tightening of bolt 49 is effected by the use of key 62 (FIG. 12) having an elongated shank 63 of about six inches, a handle 64 at one end of the shank and a curvilinear ridge 65 at the other end of the shank for mating engagement with curvilinear groove 67 (FIG. 5A) in the head 59 of bolt 49. An enlarged cylindrical portion 61 is mounted on the end of shank 63, and it fits closely in counterbore 60 to center the axis of ridge 65 with the axis of groove 67. Bolt 49 can only be turned by the use of a suitable key. The reason that stem 63 is elongated is because hole 24 is recessed within bumper 25, as can be seen from FIG. 1. In its installed position, the ends 56 of wing 54 extend through diametrically opposed slots 58 of extension tube 29.

In order to remove lock 40 from its installed position of FIG. 7, bolt 49 is unscrewed by the use of key 62 to the position shown in FIG. 8. During this unscrewing, pin 69, which has its end 70 fixed in disc 41, slides through aperture 71 in wing 54. The purpose of pin 69 is to prevent relative rotation between disc 41 and wing 54. After bolt 49 has been unscrewed so that disc 41 and wing 54 are spread apart, as shown in FIG. 8, the disc assembly 40 is moved upwardly in the direction of arrow 72, and thereafter the lock 40 is pivoted in the direction of arrow 73 to the position of FIG. 9 to remove it from the end of extension tube 29 so that the crank 23 can be inserted through extension tube 29 and winch tube 19 to apply a rotary motion to winch 12.

In order to install lock assembly 40 into extension tube 29, the above-described steps of FIGS. 7–9 are reversed. More specifically, the upper end 56 of wing 54 is inserted through opening 46 in extension tube 29 in the canted position of FIG. 9 so that it passes through the upper slot 58 of extension tube 29, and it is thereafter pivoted in a counterclockwise direction opposite to arrow 73 so that the lower end of wing 54 enters tube 29, and it is thereafter moved in a direction opposite to arrow 72 so that the lower end of wing 54 will enter lower slot 58. Thereafter, the lock assembly 40 is moved to the right so that disc portion 43 will enter opening 46, and thereafter bolt 49 is turned to draw wing 54 and disc 41 together to the position shown in FIG. 7.

After the lock assembly 40 has been fully tightened, a plastic cap 75 (FIG. 10), having a cylindrical portion 77, is snapped over the lip 35 with which it is engaged in a frictional fit to thereby protect the face of the lock against entry of debris.

In FIGS. 13–17 another embodiment of the present invention is disclosed. This embodiment utilizes a tumbler type lock construction 80 which is commercially obtainable. The extension tube 81, which is analogous to extension tube 29, is of slightly different construction. In this respect, it does not have the elongated slots 58 but instead has a pair of diametrically opposed slots 82. Otherwise, the extension tube 81 can be of the same construction as tube 29 and it functions in the same manner in that one end is inserted into winch tube 19 and its opposite end is held in bumper opening 24 and is secured therein by ramps 83 on tube 81 which have ends 84 which bear against the rear surface 34 of bumper 25, while annular lip 85 bears against the front surface 37 of bumper 25, as with tube 29 of the preceding embodiment. The tube 81 is inserted through hole 24 of the bumper, and the end remote from lip 85 is inserted into the bell mouth 22 of winch tube 19, and ramps 83 slide through hole 24 as resilient tube 81 yields and thereafter ramps 83 return to the position shown in FIG. 16 to thereby hold tube 81 firmly in position.

Tube face 87 has an opening 89 therein which is of a shape having two straight sides 90 and two curved sides 91 (FIG. 14). Opening 89 is for receiving the body 92 of tumbler lock 80 which has two straight sides 93 (FIG. 17) and two curved sides 94. Thus, the lock body 92 fits in complementary relationship with opening 89. The lock body 92 also carries a spring biased tongue 95 (FIG. 16) which has a inclined surface 97 and a straight surface 99. Thus, lock body 92 can be inserted into opening 89 and by virtue of a camming action against a curved side 91 of opening 89, tongue 97 will be pressed downwardly against the bias of its spring (not shown) as it slides through the inside 89 of tube 81, and when it reaches a slot 82, it will spring upwardly to the position shown in FIG. 16. At this time rim or collar 100 of lock 80 will bear against the face 87 of tube 81. The tumbler lock 80 is a conventional commercially obtainable product, of South Co. of Lester, Pa. and therefore a detailed description of its structure is not necessary. It is actuatable by a conventional key (FIG. 16A), which is insertable into key hole 88, to withdraw tongue 95 from its extended position shown in FIG. 16 so that the lock can be withdrawn from the tube 81.

The lock body 92 can be inserted into opening 89 in any one of two 180° opposite positions so that tongue 95 will enter either the upper slot 82 or the lower slot 82 of FIG. 16.

In order to remove lock 80 from opening 89, it is merely necessary to utilize key 101 to pull tongue 95 downwardly out of slot 82 against the bias of its spring, and thereafter the entire lock 80 can be withdrawn from tube 81. After lock 80 has been withdrawn from tube 81, the elongated crank 23 can be inserted through extension tube 81 and winch tube 19 to actuate winch 12.

In FIGS. 18-23 a preferred embodiment of the present invention is disclosed. This embodiment includes a tube 102 which is analogous to tube 29 of FIG. 4 and which has an end 103 which fits into winch tube 19 and an opposite end which is secured in bumper 25 in the same manner as described above relative to the preceding figures. In this respect, tube 102 has ramps 104 thereon which are analogous to ramps 32 of FIG. 8. Also, tube 102 has an enlarged annular rim 105 which is adjacent to the face 37 of bumper 25, and surfaces 107 (FIG. 23) of ramps 104 abut the rear surface 34 of bumper 25. Tube 102 is inserted into bumper opening 24 in the same manner as described above relative to the preceding figures. A plastic washer 109 is interposed between annular rim 105 of tube 102 and the front face 37 of bumper 25. Washer 109 has a tether 111 formed integrally therewith and a cap 112 is formed integrally with tether 111. Cap 112 serves the same function as cover 75 of FIG. 10, namely, it covers the closure disc 113 of lock 114 to prevent the entry of road debris. However, when it is removed to a position such as shown in FIG. 18, it is tethered to the lock by means of tether 111.

The lock 114 functions in substantially the same manner as the previously described lock of FIGS. 3-9. In this respect, disc 113 includes a reduced central portion 115 which has a cylindrical shoulder 117 which is of slightly smaller diameter than the internal diameter 119 of tube 102 so that when it is inserted therein, the outer edge 120 of closure disc 113 will be aligned with the outer edge 121 of annular rim 105. A bolt 122 has a thread 126 thereon. Bolt 122 is retained on closure disc 113 by a machined annular ridge 123 of the bolt. The threaded shank of bolt 122 is inserted through counterbore 125 and opening 128 of closure disc 113. The machined ridge 123 has an inclined camming surface 136 which is of slightly larger maximum diameter than opening 128. When ridge 123 is forced through opening 128, edge 130 of opening 128 will yield and then snap back so that bolt 122 will be captured in closure disc 113 with the bolt head 124 in counterbore 125, and its rear surface 127 located against surface 129 at the end of counterbore 125.

When the lock is in the locked position, the wing member 131 is drawn up against the rear surface 24 of bumper 25. This is achieved because wing member 131 is threadably mounted on bolt 122. When it is drawn up in the locked position, its surface 132 abuts rear surface 34 of the bumper. Wing 131 is essentially a bar of solid parallelogram shape having elongated opposite surfaces 132 and 133, side surfaces 135 (FIG. 20) and end surfaces 137. The end of bolt 122 is peened at 139 to prevent the wing 131 from being unthreaded from bolt 122. Alternatively, if desired a C-clip 138 can be mounted at the end of bolt 122, as shown in FIG. 21A.

It is to be noted that when wing 131 is in the fully locked position of FIG. 21 against rear bumper surface 34, it is drawn up against the surface 123' of ridge 123 at the end of thread 126. The dimension between ridge surface 123' (which abuts the face 132 of wing 131 which, in turn, abuts rear surface 34 of the bumper) and the rear surface 127 of bolt head 124 is slightly smaller than the combined thickness of bumper 25, rim 105 and resilient washer 109 in its relaxed condition. In other words, in the locked position, the distance D (which is equal to the distance between surface 123' and surface 127) is slightly smaller than the combined thickness of bumper 25, tube rim 105 and washer 109 in its relaxed condition. Thus, yieldable plastic washer 109 will be slightly compressed so that the surface 128 of closure disc 113 will fit snugly against the face 106 of tube 102. However, disc 113 will be sufficiently loose so that if it is turned, it will rotate on bolt 122 without turning it inasmuch as bolt 122 is rotatably mounted in disc 113.

As noted above, the lock 114 is shown in the locked position in FIG. 21. To unlock it, the wing 131 is unthreaded, as depicted in FIG. 22. Thereafter, the lock 113 is moved downwardly in the direction of arrow 140 until the upper end 143 of wing 131 moves out of upper slot 144 of tube 102, and thereafter the lock 113 is pivoted in the direction of arrow 141 to clear surface 119 of tube 102. The lock can then be removed from opening 119 by moving it in the direction of arrow 144. To reinstall the lock 113, the reverse of the above steps is followed.

In FIG. 19A a fragmentary side elevational view is shown of the key for turning bolt 122. This key has a shaft 145 and it has a curvilinear ridge 147 at the end thereof. It also has an annular collar 149 which fits closely into counterbore 125 to center curvilinear ridge 147 relative to curvilinear groove 150 (FIG. 19) in the head 124 of bolt 122. Shaft 145 of the key of FIG. 19A terminates at a handle such as 64 of FIG. 12.

As can be seen from FIG. 23, the lower end 150 of wing 131 below bolt 122 is longer than the upper end 151 above bolt 122. Because of this geometry, end 150 has to be inserted through one of the slots 144 before the lock can be rotated into position wherein the shorter end 151 can be moved into tube 102 prior to the lock being moved to the position of FIG. 22.

In FIGS. 24 and 25 an alternate wing 160 is shown which can be substituted for wing 131 of FIGS. 18–23. Wing 160 includes a spring steel bar 161 with curved ends 162, and a nut 163 is press-fitted into the central portion of bar 161. As with the preceding embodiment, nut 163 is threadably mounted on the threads 126 of bolt 122.

While preferred embodiments of the present invention have been disclosed, it will be appreciated that it is not limited thereto but may be otherwise embodied within the scope of the following claims.

What is claimed is:

1. In an automotive vehicle having a frame mounting a spare wheel hoist and storage winch and having a winch inlet tube extending outwardly from said winch toward the rear of said vehicle and said winch inlet tube having an open end remote from said winch and an interior which is unobstructed for a substantial portion of its length leading from said open end toward said winch for receiving an elongated crank which passes through said substantial portion of the length of said winch inlet tube for actuating said winch, and said automotive vehicle having a rear bumper with a hole therein through which said elongated crank can be passed for insertion into said winch inlet tube, a lock arrangement for blocking said open end of said winch inlet tube comprising an extension tube, a first end on said extension tube inserted into said open end of said winch inlet tube, a second end on said extension tube permanently mounted in said hole of said bumper, a closure on said second end of said extension tube, and a key-actuated lock on said closure for selectively permitting removal of said closure from said second end of said extension tube to thereby permit said elongated crank to pass through said extension tube and through said winch inlet tube for actuating said winch.

2. In an automotive vehicle as set forth in claim 1 wherein said second end of said extension tube is mounted in said hole of said bumper by means of abutments thereon on opposite sides of said bumper.

3. In an automotive vehicle as set forth in claim 2 wherein said abutments include a lip on said extension tube located on the opposite side of said bumper from said winch.

4. In an automotive vehicle as set forth in claim 3 wherein said abutments include a second lip on said extension tube on the opposite side of said bumper from said lip.

5. In an automotive vehicle as set forth in claim 1 wherein said closure comprises a tumbler-type lock having an elongated lock body, an opening in said second end of said extension tube for receiving said elongated lock body, a tongue on said lock body, a second opening in said extension tube for receiving said tongue, and a rim on said lock body for engaging the border of said opening in said second end of said extension tube.

6. In an automotive vehicle as set forth in claim 5 wherein said second end of said extension tube is mounted in said hole of said bumper by means of abutments thereon on opposite sides of said bumper.

7. In an automotive vehicle as set forth in claim 6 wherein said abutments include a lip on said extension tube located on the opposite side of said bumper from said winch.

8. In an automotive vehicle as set forth in claim 7 wherein said abutments include a second lip on said extension tube on the opposite side of said bumper from said lip.

9. In an automotive vehicle having a frame mounting a spare wheel hoist and storage winch and having a winch inlet tube extending outwardly from said winch toward the rear of said vehicle and said winch inlet tube having an open end remote from said winch for receiving an elongated crank which passes through said winch inlet tube for actuating said winch, and said automotive vehicle having a rear bumper with a hole therein through which said elongated crank can be passed for insertion into said winch inlet tube, a lock arrangement for blocking said open end of said winch inlet tube comprising an extension tube, a first end on said extension tube inserted into said open end of said winch inlet tube, a second end on said extension tube mounted in said hole of said bumper, a closure on said second end of said extension tube, a key-actuated lock on said closure for selectively permitting removal of said closure from said second end of said extension tube to thereby permit said elongated crank to pass through said extension tube and through said winch inlet tube for actuating said winch, said second end of said extension tube being mounted in said hole of said bumper by means of abutments thereon on opposite sides of said bumper, said abutments including a first lip on said extension tube located on the opposite side of said bumper from said winch, and a second lip on said extension tube on the opposite side of said bumper from said lip, said second lip including a sloping surface extending upwardly away from said winch, and a transverse edge at the end of said sloping surface for facing said bumper at the outside of said hole, said extension tube being resilient in the area of said sloping surface.

10. In an automotive vehicle having a frame mounting a spare wheel hoist and storage winch and having a winch inlet tube extending outwardly from said winch toward the rear of said vehicle and said winch inlet tube having an open end remote from said winch for receiving an elongated crank which passes through said winch inlet tube for actuating said winch, and said automotive vehicle having a rear bumper with a hole therein through which said elongated crank can be passed for insertion into said winch inlet tube, a lock arrangement for blocking said open end of said winch inlet tube comprising an extension tube, a first end on said extension tube inserted into said open end of said winch inlet tube, a second end on said extension tube mounted in said hole of said bumper, a closure on said second end of said extension tube, a key-actuated lock on said closure for selectively permitting removal of said closure from said second end of said extension tube to thereby permit said elongated crank to pass through said extension tube and through said winch inlet tube for actuating said winch, said closure comprising a tumbler-type lock having an elongated lock body, an opening in said second end of said extension tube for receiving said elongated lock body, a tongue on said lock body, a second opening in said extension tube for receiving said tongue, and a rim on said lock body for engaging the border of said opening in said second end of said extension tube, said second end of said extension tube being mounted in said hole of said bumper by means of abutments thereon on opposite sides of said bumper, said abutments including a first lip on said extension tube located on the opposite side of said bumper from said winch, said abutments including a second lip on said extension tube on the opposite side of said bumper from said lip, said second lip including a sloping surface extending upwardly away from said winch, and a transverse edge at the end of said sloping surface for facing said bumper at the outside of said hole, said extension tube being resilient in the area of said sloping surface.

11. In an automotive vehicle having a frame mounting a spare wheel hoist and storage winch and having a winch inlet tube extending outwardly from said winch toward the rear of said vehicle and said winch inlet tube having an open end remote from said winch for receiving an elongated crank which passes through said winch inlet tube for actuating said winch, and said automotive vehicle having a rear bumper with a hole therein through which said elongated crank can be passed for insertion into said winch inlet tube, a lock arrangement for blocking said open end of said winch inlet tube comprising an extension tube, a first end on said extension tube inserted into said open end of said winch inlet tube, a second end on said extension tube mounted in said hole of said bumper, a closure on said second end of said extension tube, a key-actuated lock on said closure for selectively permitting removal of said closure from said second end of said extension tube to thereby permit said elongated crank to pass through said extension tube and through said winch inlet tube for actuating said winch, said closure comprising a tumbler-type lock having an elongated lock body, an opening in said second end of said extension tube for receiving said elongated lock body, a tongue on said lock body, a second opening in said extension tube for receiving said tongue, and a rim on said lock body for engaging the border of said opening in said second end of said extension tube, said opening in said extension tube being of a shape to receive said lock body in two 180° opposite orientations, and said extension tube having two second openings for receiving said tongue in either of said 180° opposite orientations.

12. In an automotive vehicle having a frame mounting a spare wheel hoist and storage winch and having a winch inlet tube extending outwardly from said winch toward the rear of said vehicle and said winch inlet tube having an open end remote from said winch for receiving an elongated crank which passes through said winch inlet tube for actuating said winch, and said automotive vehicle having a rear bumper with a hole therein through which said elongated crank can be passed for insertion into said winch inlet tube, a lock arrangement for blocking said open end of said winch inlet tube comprising an extension tube, a first end on said extension tube inserted into said open end of said winch inlet tube, a second end on said extension tube mounted in said hole of said bumper, a closure on said second end of said extension tube, a key-actuated lock on said closure for selectively permitting removal of said closure from said second end of said extension tube to thereby permit said elongated crank to pass through said extension tube and through said winch inlet tube for actuating said winch, said second end of said extension tube including an opening for receiving said closure, a lip surrounding said opening on the opposite side of said bumper from said winch, and said closure comprising a disc having an outer edge portion which abuts said lip, opposed slots in said extension tube on the opposite side of said bumper from said lip, a screw rotatably mounted in said disc, a head with a key-receiving groove on said screw, a wing mounted on said screw on the opposite end thereof from said head, opposed ends on said wing for extending through said opposed slots after said wing has been inserted through said opening in a canted orientation, and said wing having opposite ends which extend beyond said opposed slots and press against said bumper when said screw is tightened to thereby draw said outer edge portion of said disc against said lip.

13. In an automotive vehicle as set forth in claim 12 wherein said disc includes a central portion which enters said opening and is of an outer diameter which is substantially equal to the inner diameter of said extension tube within said lip to thereby center said disc within said opening.

14. In an automotive vehicle as set forth in claim 12 wherein said abutments include a second lip on said extension tube on the opposite side of said bumper from said lip.

15. In an automotive vehicle as set forth in claim 14 wherein said second lip includes a sloping surface extending upwardly away from said winch, and a transverse edge at the end of said sloping surface for facing said bumper at the outside of said hole, said extension tube being resilient in the area of said sloping surface.

16. A lock arrangement for blocking an open end of a winch inlet tube of a spare wheel hoist and storage winch comprising an extension tube, a first end on said extension tube for insertion into an open end of said winch inlet tube, a second end on said extension tube, means on said second end of said extension tube for permanently mounting said extension tube in a hole of a bumper, an opening in said second end of said extension tube, said extension tube being unobstructed between its first and second ends, a closure on said second end of said extension tube for obstructing said opening in said second end of said extension tube, and a key-actuated lock on said closure for selectively permitting removal of said closure from said opening in said second end of said extension tube while said extension tube remains in place in said winch inlet tube and said bumper to thereby permit passage of a winch actuation member through said permanently mounted unobstructed extension tube and through said winch inlet tube for actuating said winch.

17. A lock arrangement as set forth in claim 16 wherein said means on said second end of said tube include lips on said extension tube for positioning of the opposite sides of said bumper.

18. A lock arrangement as set forth in claim 16 wherein said closure comprises a tumbler-type lock having an elongated lock body, an opening in said second end of said extension tube for receiving said elongated lock body, a tongue on said lock body, a second opening in said extension tube for receiving said tongue, and a rim on said lock body for engaging the border of said opening in said second end of said extension tube.

19. A lock arrangement as set forth in claim 18 wherein said second end of said extension tube is mounted in said hole of said bumper by means of abutments thereon on opposite sides of said bumper.

20. A lock arrangement as set forth in claim 19 wherein said abutments include lips on said extension tube.

21. A lock arrangement for blocking an open end of a winch inlet tube of a spare wheel hoist and storage winch comprising an extension tube, a first end on said extension tube for insertion into an open end of said winch inlet tube, a second end on said extension tube for mounting in a hole of a bumper, a closure on said second end of said extension tube, a key-actuated lock on said closure for selectively permitting removal of said closure from said second end of said extension tube to thereby permit passage of a winch actuation member through said extension tube and through said winch inlet tube for actuating said winch, securing means on said second end of said extension tube for securing said extension tube in said hole of said bumper, said securing means include lips on said extension tube for positioning of the opposite sides of said bumper, certain of said lips include a sloping surface and a transverse edge at the end of said sloping surface for facing said bumper at the outside of said hole, and said extension tube being resilient in the area of said sloping surface.

22. A lock arrangement for blocking an open end of a winch inlet tube of a spare wheel hoist and storage winch comprising an extension tube, a first end on said extension tube for insertion into an open end of said winch inlet tube, a second end on said extension tube for mounting in a hole of a bumper, a closure on said second end of said extension tube, a key-actuated lock on said closure for selectively permitting removal of said closure from said second end of said extension tube to thereby permit passage of a winch actuation member through said extension tube and through said winch inlet tube for actuating said winch, said closure comprising a tumbler-type lock having an elongated lock body, an opening in said second end of said extension tube for receiving said elongated lock body, a tongue on said lock body, a second opening in said extension tube for receiving said tongue, a rim on said lock body for engaging the border of said opening in said second end of said extension tube, said second end of said extension tube being mounted in said hole of said bumper by means of abutments thereon on opposite sides of said bumper, said abutments including lips on said extension tube, certain of said lips including a sloping surface, and a transverse edge at the end of said sloping surface for facing said bumper at the outside of said hole, said extension tube being resilient in the area of said sloping surface.

23. A lock arrangement for blocking an open end of a winch inlet tube of a spare wheel hoist and storage winch comprising an extension tube, a first end on said extension tube for insertion into an open end of said winch inlet tube, a second end on said extension tube for mounting in a hole of a bumper, a closure on said second end of said extension tube, a key-actuated lock on said closure for selectively permitting removal of said closure from said second end of said extension tube to thereby permit passage of a winch actuation member through said extension tube and through said winch inlet tube for actuating said winch, said closure comprising a tumbler-type lock having an elongated lock body, an opening in said second end of said extension tube for receiving said elongated lock body, a tongue on said lock body, a second opening in said extension tube for receiving said tongue, a rim on said lock body for engaging the border of said opening in said second end of said extension tube, said opening in said extension tube being of a shape to receive said lock body in two 180° opposite orientations, and said extension tube having two second openings for receiving said tongue in either of said 180° opposite orientations.

24. A lock arrangement for blocking an open end of a winch inlet tube of a spare wheel hoist and storage winch comprising an extension tube, a first end on said extension tube for insertion into an open end of said winch inlet tube, a second end on said extension tube for mounting in a hole of a bumper, a closure on said second end of said extension tube, a key-actuated lock on said closure for selectively permitting removal of said closure from said second end of said extension tube to thereby permit passage of a winch actuation member through said extension tube and through said winch inlet tube for actuating said winch, said second end of said extension tube including an opening for receiving said closure, a lip surrounding said opening, and said closure comprising a disc having an outer edge portion which abuts said lip, opposed slots in said extension tube, a screw rotatably mounted in said disc, a head with a key-receiving groove on said screw, a wing mounted on said screw on the opposite end thereof from said head, opposite ends on said wing for extending through said opposed slots after said wing has been inserted through said opening in a canted orientation, and said wing having opposite ends which extend beyond said opposed slots and press against said bumper when said screw is tightened to thereby draw said outer edge portion of said disc against said lip.

25. A lock arrangement as set forth in claim 24 wherein said disc includes a central portion which enters said opening and is of an outer diameter which is substantially equal to the inner diameter of said extension tube within said lip to thereby center said disc within said opening.

26. A lock arrangement as set forth in claim 24 including a second lip on said extension tube spaced from said lip.

27. A lock arrangement as set forth in claim 26 wherein said second lip includes a sloping surface extending upwardly away from said extension tube, and a transverse edge at the end of said sloping surface for facing said lip, said extension tube being resilient in the area of said sloping surface.

28. In an automotive bumper having a front surface and a rear surface and having an aperture extending between said front and rear surfaces, a lock arrangement for selectively closing said aperture comprising an annular member having a first lip located at said front surface, a second lip located at said rear surface, an intermediate portion within said aperture joining said first and second lips, an opening within said intermediate portion, a closure disc, an edge on said closure disc positioned proximate said first lip, a wing on said closure disc positioned on the opposite side of said bumper from said first lip, and a key-operated linkage joining said closure disc and said wing.

29. In an automotive bumper as set forth in claim 28 wherein said closure disc includes a shoulder which fits within said opening, and a portion on said closure which bears against said first lip.

30. A lock arrangement for insertion into an aperture of an automotive bumper for blocking access to an open end of a winch inlet tube of a spare wheel hoist and storage winch comprising an annular member for permanent mounting in said aperture of said bumper, an opening defined by said annular member, a closure mounted on said annular member and obstructing said opening, and a key-actuated lock on said closure for selectively permitting removal of said closure from said opening in said annular member to thereby permit passage of a winch actuating member through said opening in said annular member and through said winch inlet tube for actuating said winch.

31. A lock arrangement as set forth in claim 30 wherein said annular member includes axially spaced lips thereon for positioning on opposite sides of said bumper.

32. A lock arrangement as set forth in claim 31 wherein said closure includes a shoulder which fits within said opening, and a portion on said closure located outwardly of said shoulder which bears against one of said lips.

33. In an automotive vehicle having a winch inlet tube having an open end associated with a spare wheel hoist and storage winch and having a bumper having a front surface and a rear surface and having an aperture extending between said front and rear surfaces, a lock arrangement for insertion into said aperture of said automotive bumper for blocking said open end of said winch inlet tube comprising an annular member permanently mounted in said aperture of said bumper, an opening defined by said annular member, a closure mounted on said annular member and obstructing said opening, and a key-actuated lock on said closure for selectively permitting removal of said closure from said annular member to thereby permit passage of a winch actuating member through said opening in said annular member and through said annular member and through said winch inlet tube for actuating said winch.

* * * * *